(12) United States Patent
Jeon et al.

(10) Patent No.: US 9,827,966 B2
(45) Date of Patent: Nov. 28, 2017

(54) ELECTRONIC BRAKE SYSTEM

(71) Applicant: MANDO CORPORATION, Gyeonggi-do (KR)

(72) Inventors: In-Wook Jeon, Seoul (KR); Seong-Ho Choi, Anyang-si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 14/981,920

(22) Filed: Dec. 29, 2015

(65) Prior Publication Data

US 2016/0185332 A1 Jun. 30, 2016

(30) Foreign Application Priority Data

Dec. 30, 2014 (KR) .................. 10-2014-0193773

(51) Int. Cl.
| | |
|---|---|
| *B60T 13/68* | (2006.01) |
| *B60T 13/20* | (2006.01) |
| *B60T 13/14* | (2006.01) |
| *B60T 13/16* | (2006.01) |
| *B60T 13/58* | (2006.01) |
| *B60T 7/04* | (2006.01) |
| *B60T 13/66* | (2006.01) |
| *B60T 8/40* | (2006.01) |
| *B60T 8/34* | (2006.01) |

(52) U.S. Cl.
CPC ............ *B60T 13/686* (2013.01); *B60T 7/042* (2013.01); *B60T 8/348* (2013.01); *B60T 8/4081* (2013.01); *B60T 13/147* (2013.01); *B60T 13/20* (2013.01); *B60T 13/662* (2013.01)

(58) Field of Classification Search
CPC ........ B60T 7/042; B60T 8/4081; B60T 13/20; B60T 13/58; B60T 13/147; B60T 13/167; B60T 13/662; B60T 13/686; B60T 13/745
USPC ...................................... 303/9.61, 10, 113.4
See application file for complete search history.

(56) References Cited

U.S. PATENT DOCUMENTS

| | | | | |
|---|---|---|---|---|
| 6,192,685 | B1 * | 2/2001 | Bourlon | B60T 7/04 60/566 |
| 6,249,736 | B1 * | 6/2001 | Schmidt | B60T 7/12 303/115.2 |
| 2002/0050739 | A1 * | 5/2002 | Koepff | B60T 8/326 303/122.09 |
| 2006/0202551 | A1 * | 9/2006 | Gottwick | B60T 8/4081 303/116.1 |
| 2012/0103452 | A1 * | 5/2012 | Toyohira | B60T 7/042 138/31 |
| 2013/0214587 | A1 * | 8/2013 | Yang | B60T 13/686 303/6.01 |

FOREIGN PATENT DOCUMENTS

EP 2520473 11/2012

* cited by examiner

*Primary Examiner* — Robert A Siconolfi
*Assistant Examiner* — San Aung
(74) *Attorney, Agent, or Firm* — Ladas & Parry, LLP

(57) ABSTRACT

An electronic brake system may be capable of performing braking operation according to a pedal effort of a driver even when the brake system operates abnormally as well as simplifying a configuration thereof by minimizing the number of valves for controlling a flow of oil pressure and precisely controlling pressure therein.

19 Claims, 6 Drawing Sheets

[Fig. 1]
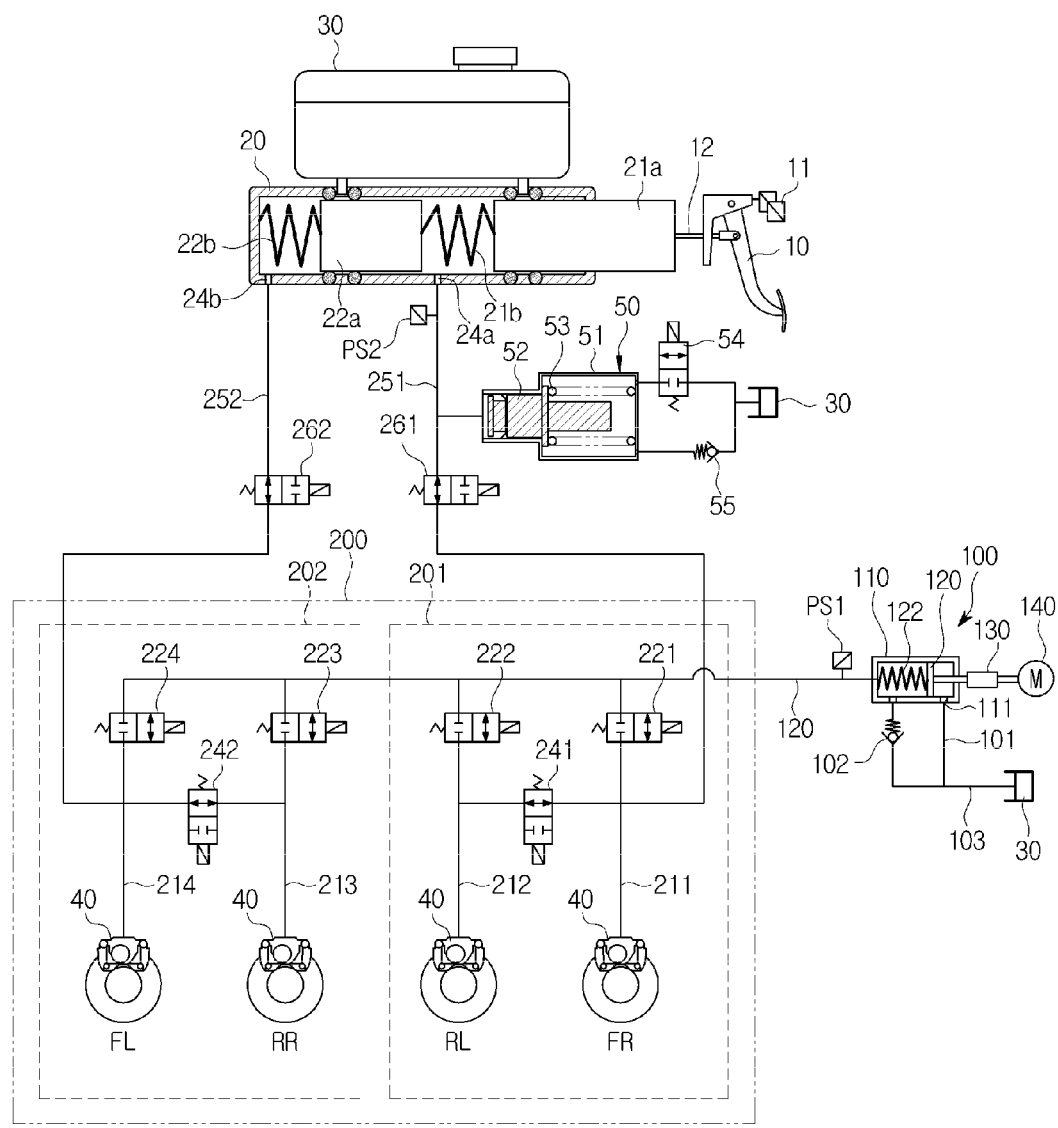

[Fig. 2]
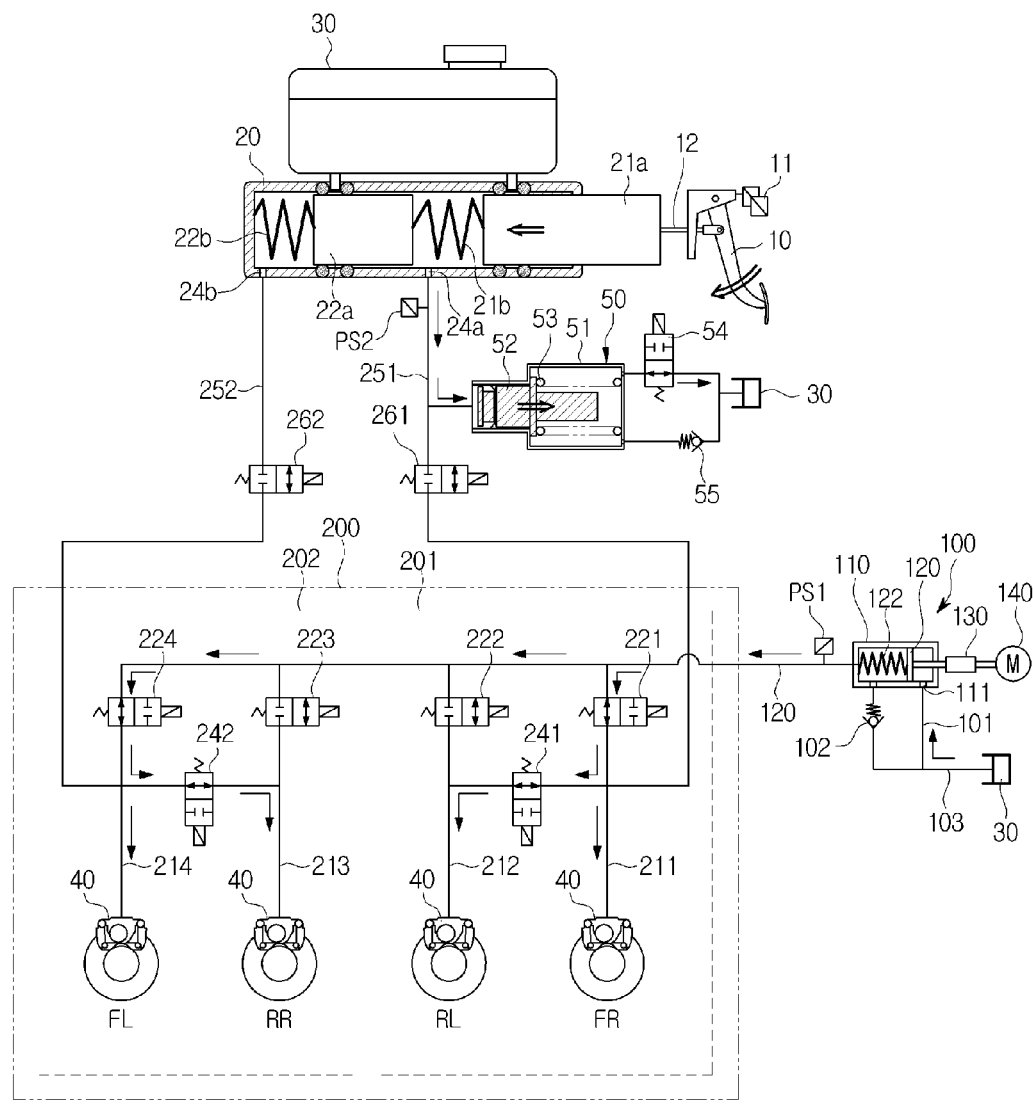

[Fig. 3]
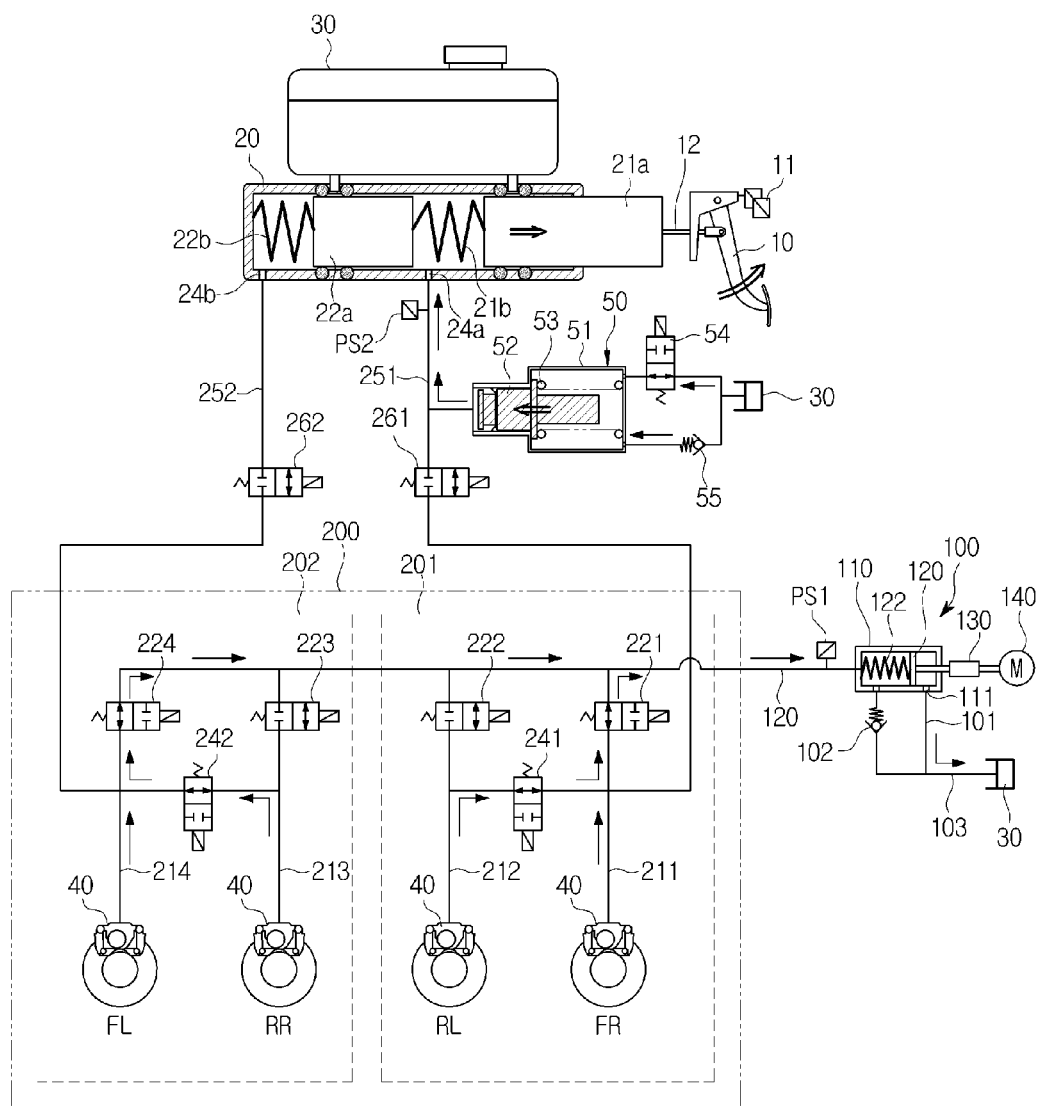

[Fig. 4]
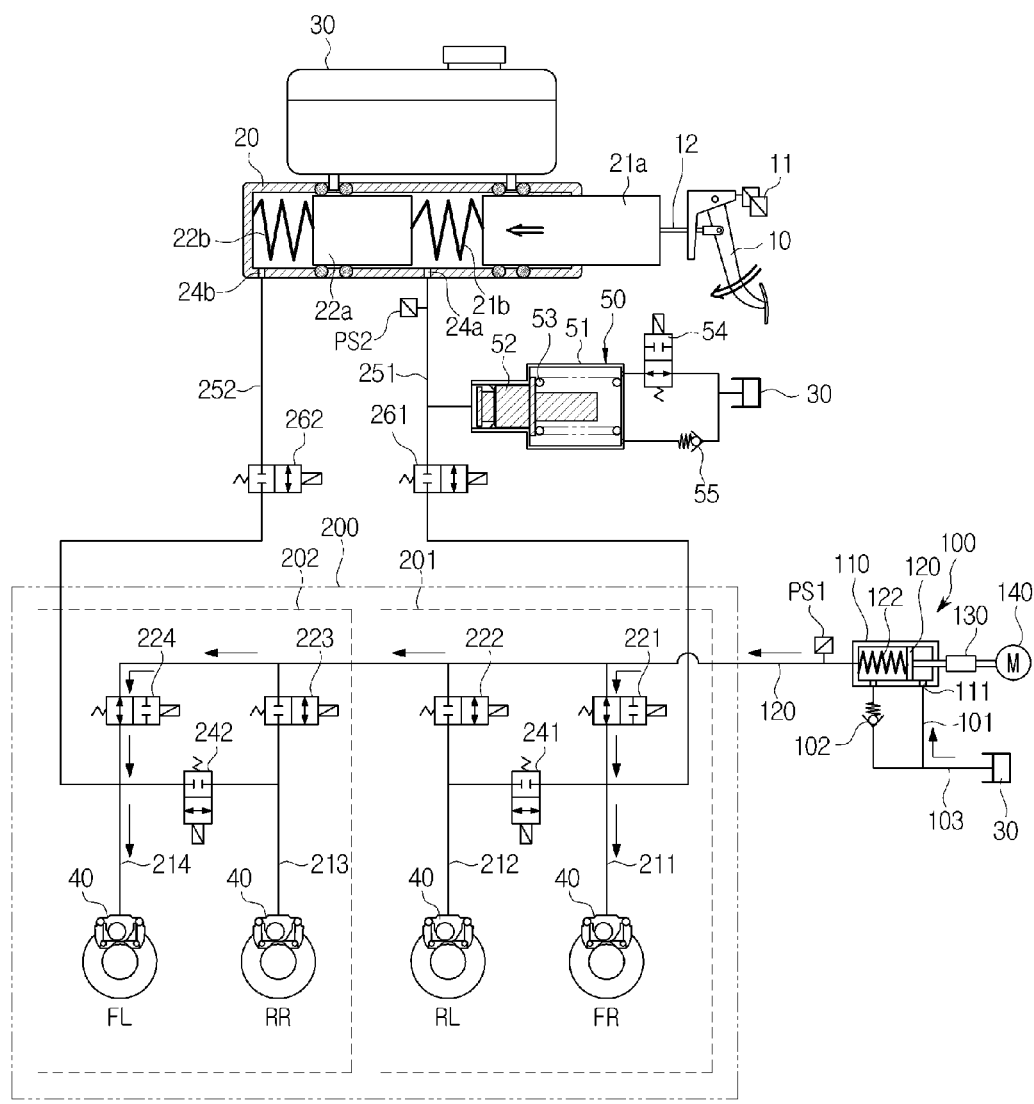

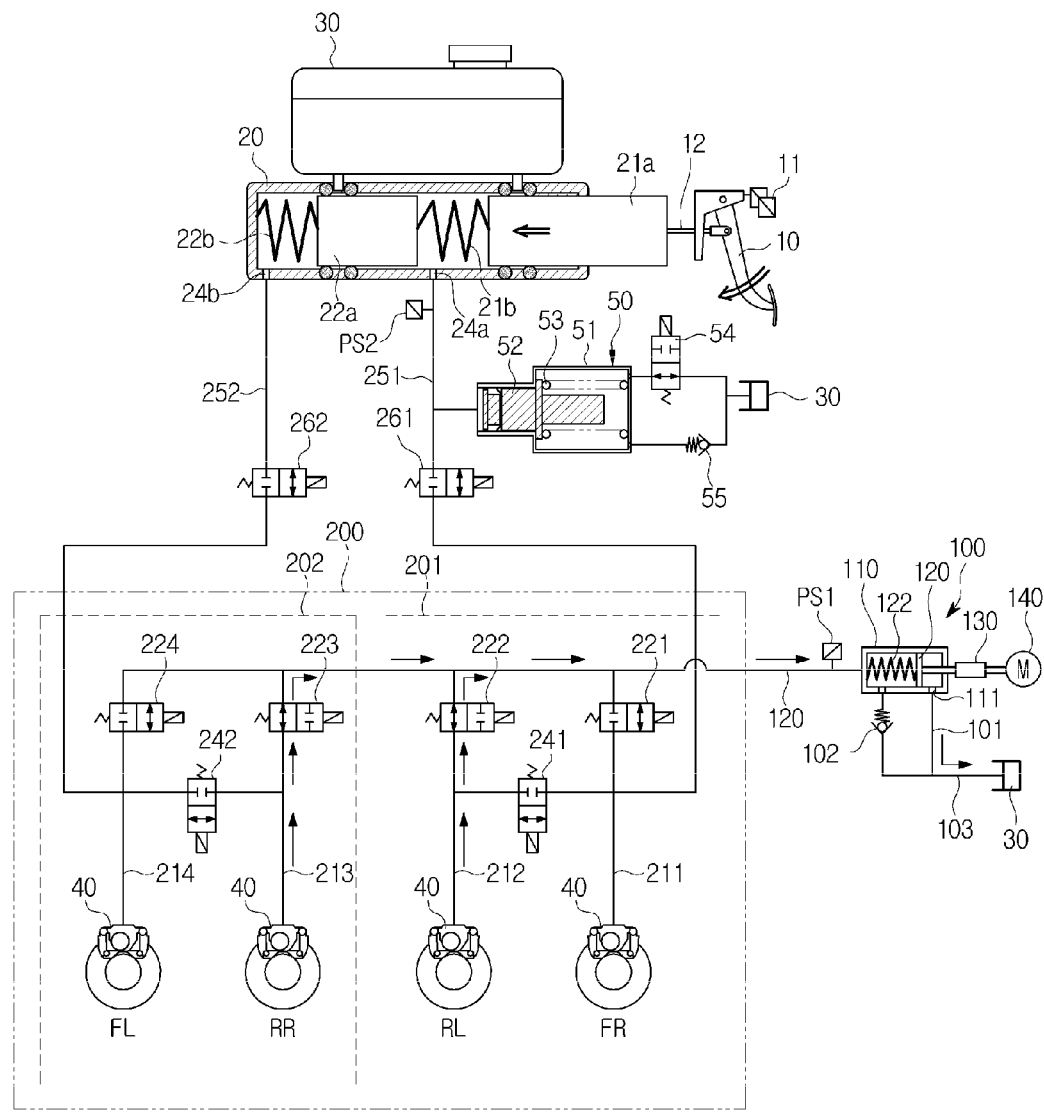
[Fig. 5]

[Fig. 6]
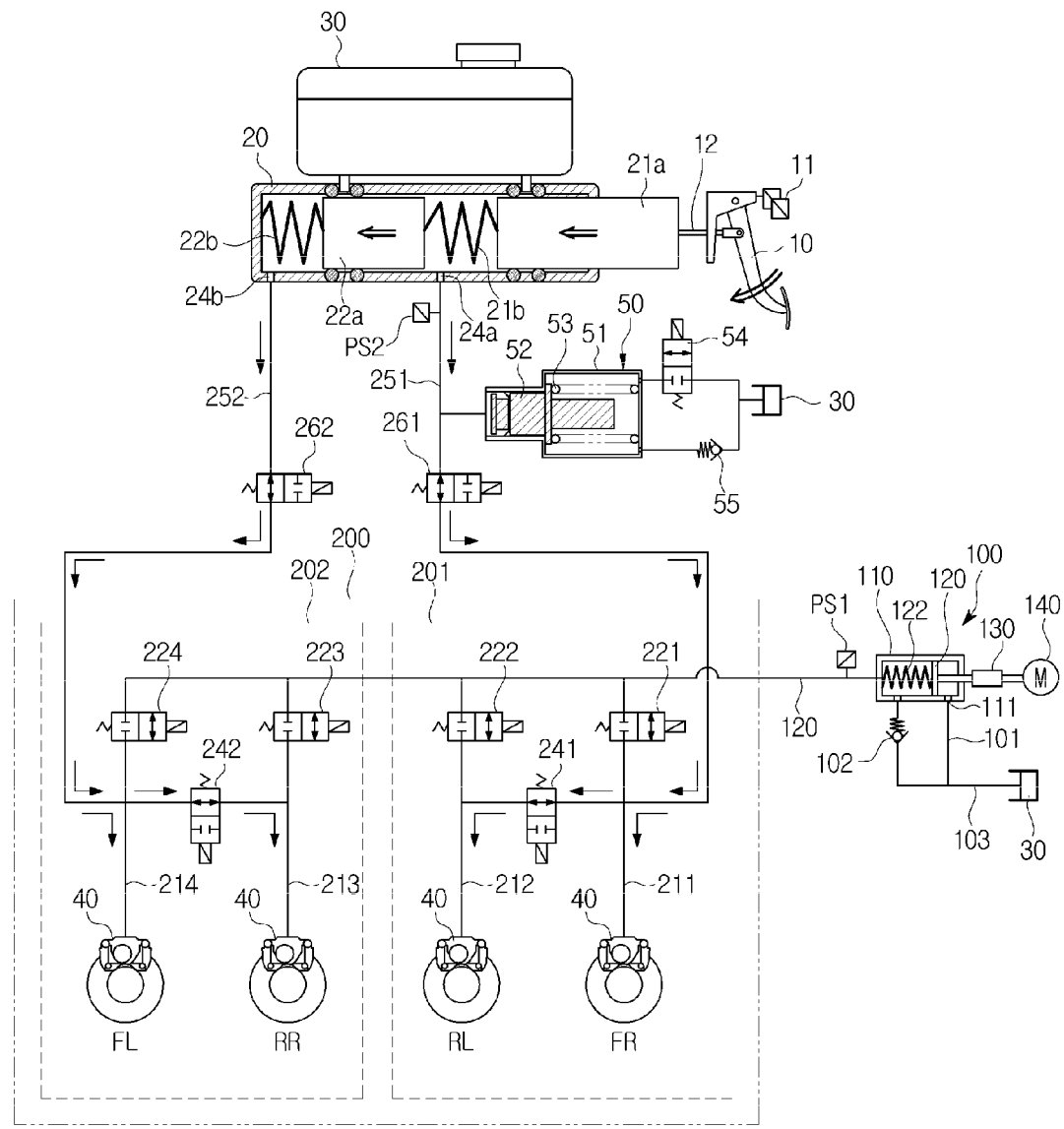

ELECTRONIC BRAKE SYSTEM

CROSS-REFERENCE TO RELATED APPLICATION

This application claims the priority to Korean Patent Application No. 10-2014-0193773, filed on Dec. 30, 2014 in the Korean Intellectual Property Office, the disclosure of which is incorporated herein by reference in its entirety.

BACKGROUND

1. Field

Embodiments of the present invention relate to an electronic brake system, and more particularly, to an electronic brake system capable of a structure simplification and a precise pressure control.

2. Description of the Related Art

Every vehicle requires a braking ability and thus requires a brake system, and recently, various types of the brake systems have been proposed for realizing stronger and more stable braking forces. Examples of the brake systems include an anti-lock brake system (ABS) which prevents wheel slip during braking, a brake traction control system (BTCS) which prevents driving wheel slip when a sudden acceleration or a rapid acceleration occurs in a vehicle, and an electronic stability control system (ESC) which together with the ABS and BTSC to control a hydraulic pressure of a braking system so that a vehicle is maintained under a stable driving condition, etc.

Such an electronic brake system includes a plurality of solenoid valves for controlling a brake oil pressure transferred to wheel cylinders (referred to as hydraulic brakes or disk brakes) mounted on the wheels of a vehicle, a pair of low pressure accumulators for temporarily storing oil discharged from the wheel cylinders, a motor and a pump for forcibly pumping the oil stored in the low pressure accumulators, a plurality of check valves to prevent a backflow of oil, and an electronic control unit (ECU) for controlling the operations of the solenoid valves and the motor which are compactly built in an oil pressure block formed of aluminum. Further, a hydraulic pressure supply unit is provided and being used, that receives an electrical signal from a pedal displacement sensor for detecting a displacement of the brake pedal responding to the driver's intention to brake when a driver steps on a brake and supplies pressure to the wheel cylinders.

The electronic brake system provided with the above hydraulic pressure supply unit is disclosed as European Patent No. 2520473. According to the disclosure, the hydraulic pressure supply unit is designed to generate a brake pressure by operating a motor according to a pressure on the brake pedal. Here, the brake pressure is generated by converting a rotatory power of the motor to a rectilinear movement to press a piston.

However, in the electronic brake system with the above structure, the arrangement of the plurality of solenoid valves provided to control the pressure transferred to the wheel cylinders is complex, and, in addition, the plurality of solenoid valves are individually operated to control a hydraulic pressure delivered to the wheel cylinder provided in each wheel, thereby increasing the vibration and the noise due to operating the solenoid valves.

Further, since the configuration of the plurality of the solenoid valves and the flow paths for controlling the pressure according to various control modes becomes complex and in addition, the weight and the volume of the system are increased because a motor, a pump, and a low pressure accumulator are provided additionally, the ease of mounting and the efficient use of space are compromised, and vibration and noise due to motor and pump operations are increased.

SUMMARY

Therefore, it is an aspect of the present invention to provide an electronic brake system capable of performing braking according to a pedal effort of a driver even when a brake system operates abnormally as well as simplifying a configuration thereof by minimizing the number of valves for controlling a flow of oil pressure and precisely controlling pressure therein.

Additional aspects of the invention will be set forth in part in the description which follows and, in part, will be obvious from the description, or may be learned by practice of the invention.

In accordance with one aspect of the present invention, an electronic brake system includes a reservoir in which oil is stored, a master cylinder having a first oil pressure port and a second oil pressure port and coupled with the reservoir to receive the oil, a pedal displacement sensor configured to detect a displacement of a brake pedal, and a simulation device connected to the master cylinder and provided so that reaction is provided according to a pedal effort of the brake pedal, and the electronic brake system includes a hydraulic pressure supply unit configured to output an electrical signal through the pedal displacement sensor to operate a motor when the brake pedal operates, and configured to convert rotatory power of the motor to rectilinear movement, an oil pressure control unit having a first oil pressure circuit and a second oil pressure circuit connected to the hydraulic pressure supply unit through a main oil pressure path, and each configured to control two wheels so that a hydraulic pressure is received using a force generated by the hydraulic pressure supply unit to perform braking, and an electronic control unit configured to control the motor and valves based on hydraulic pressure information and pedal displacement information, wherein the oil pressure control unit includes a first inlet valve and a second inlet valve respectively disposed at upper streams of two wheel cylinders to control the hydraulic pressure flowing into the two wheel cylinders respectively installed on the two wheels provided in the first oil pressure circuit, a third inlet valve and a fourth inlet valve respectively disposed at upper streams of two wheel cylinders to control the hydraulic pressure flowing into the two wheel cylinders respectively installed on the two wheels provided in the second oil pressure circuit, a first balance valve configured to connect or disconnect the two wheel cylinders to which the first inlet valve and the second inlet valve are connected, and a second balance valve configured to connect or disconnect the two wheel cylinders to which the third inlet valve and the fourth inlet valve are connected, wherein the hydraulic pressure discharged from the four wheel cylinders is controlled by a rotation in a direction opposite a rotation direction of the motor of the hydraulic pressure supply unit while braking.

The inlet valves may be provided with solenoid valves in a normal closed type which operates a valve to be open when an open signal is received in a state in which the valve is closed at ordinary time.

When the hydraulic pressure is discharged from the wheel cylinders by rotating the motor of the hydraulic pressure supply unit in a reverse direction, the first inlet valve and the second inlet valve may be open.

When the hydraulic pressure is discharged from the wheel cylinders by rotating the motor of the hydraulic pressure supply unit in a reverse direction, only one of the first inlet valve and the second inlet valve may be open and only one of the third inlet valve and the fourth inlet valve may be open.

The first and second balance valves may be provided with solenoid valves in a normal open type which operates a valve to be closed when a close signal is received from the electronic control unit in a state in which the valve is open at ordinary time.

The electronic brake system may further include a first backup path configured to connect the first oil pressure port and the first balance valve so that oil is directly supplied to the wheel cylinders when the electronic brake system operates abnormally, a second backup path configured to connect the second oil pressure port and the second balance valve, a first cut valve provided on the first backup path and configured to control a flow of the oil, and a second cut valve provided on the second backup path and configured to control a flow of the oil.

The first and second cut valves may be provided with solenoid valves in a normal open type which operates a valve to be closed when a close signal is received from the electronic control unit in a state in which the valve is open at ordinary time.

The hydraulic pressure supply unit may include a motor configured to generate a rotary power by the electrical signal of the pedal displacement sensor, a power converter configured to convert a rotary movement of the motor to a rectilinear movement, an oil pressure piston connected to the power converter and configured to perform a rectilinear movement, a pressure chamber slidably provided with the oil pressure piston and connected to the first and second oil pressure circuits through the main oil pressure path, and an oil pressure spring provided in the pressure chamber and configured to elastically support the oil pressure piston, wherein the pressure chamber may be connected to the reservoir through an oil path to receive the oil.

A check valve may be installed on the oil path to prevent a flow of a pressure of the pressure chamber backward, and to suction and store the oil in the pressure chamber when the oil pressure piston is returned.

BRIEF DESCRIPTION OF THE DRAWINGS

Hereinafter, while the present invention will be described in detail with reference to the accompanying drawings, since following drawings deal with exemplary embodiments of the present invention, the spirit and scope of the present invention should not be limited to the following drawings:

FIG. 1 is an oil pressure circuit diagram illustrating an un-braked state of an electronic brake system according to one exemplary embodiment of the present invention;

FIG. 2 is an oil pressure circuit diagram when a brake of an electronic brake system operates normally according to one exemplary embodiment of the present invention;

FIG. 3 is an oil pressure circuit diagram when a brake of an electronic brake system is released normally according to one exemplary embodiment of the present invention;

FIG. 4 is an oil pressure circuit diagram for describing an anti-lock brake system (ABS) being operated by an electronic brake system according to one exemplary embodiment of the present invention;

FIG. 5 is an oil pressure circuit diagram for describing an electronic brake system being operated in a dump mode, according to one exemplary embodiment of the present invention; and FIG. 6 is an oil pressure circuit diagram when an electronic brake system operates abnormally, according to one exemplary embodiment of the present invention.

DETAILED DESCRIPTIONS

Hereinafter, embodiments of the present invention will be described in detail with reference to the accompanying drawings. The embodiments are provided in order to fully explain the spirit and scope of the present invention for those skilled in the art. Thus, the present invention should not be construed as limited to the embodiments set forth herein and may be accomplished in other various embodiments. Parts irrelevant to description are omitted in the drawings in order to clearly explain the present invention. The sizes of the elements in the drawings may be exaggerated in order to facilitate understanding.

FIG. 1 is an oil pressure circuit diagram illustrating an un-braked state of an electronic brake system according to one exemplary embodiment of the present invention.

Referring to the drawing, the electronic brake system generally includes a master cylinder 20 which generates a hydraulic pressure, a reservoir 30 coupled with an upper portion of the master cylinder 20 to store oil, an input rod 12 which presses the master cylinder 20 according to a pedal effort of a brake pedal 10, a wheel cylinder 40 to which the hydraulic pressure is transferred to perform a braking action of each wheel RR, RL, FR, and FL, a pedal displacement sensor 11 which detects a displacement of the brake pedal 10, and a simulation device 50 which provides a reaction against the pedal effort of the brake pedal 10.

Here, the master cylinder 20 is formed with at least one chamber to generate the hydraulic pressure. According to the drawing, a first piston 21a and a second piston 22a form two chambers, and the first piston 21a is in contact with the input rod 12. In order to ensure safety in a breakdown, the master cylinder 20 has two chambers. For example, one of the two chambers is connected to a right front wheel FR and a left rear wheel RL of a vehicle, and the other chamber is connected to a left front wheel FL and a right rear wheel RR thereof. Alternatively, one of the two chambers may be connected to two front wheels FR and FL, and the other chamber may be connected to two rear wheels RR and RL. The reason why two chambers are formed independently as described above is for braking a vehicle even when one chamber fails. In the master cylinder 20, first and second oil pressure ports 24a and 24b are formed to discharge the hydraulic pressure of the two chambers.

Further, a first spring 21b is disposed between the first piston 21a and the second piston 22a of the master cylinder 20, and a second spring 22b is provided between ends of the second piston 22a and the master cylinder 20. That is, the first spring 21b and the second spring 22b are respectively provided for the two chambers to store elastic force due to the compression of the first piston 21a and the second piston 22a. The elastic force pushes the first and second pistons 21a and 22a to return to their original positions when the force pushing the first piston 21a is smaller than the elastic force.

Meanwhile, there is no gap between the master cylinder 20 and the input rod 12 by pressing the input rod 12 for pressing the first piston 21a of the master cylinder 20 against the first piston 21a to be in contact with each other. That is, when the brake pedal 10 is pressed, the master cylinder 20 is directly pressed without apedal invalid stroke section.

The simulation device 50 for providing a reaction based on the pedal effort of the brake pedal 10 is connected to a first backup path 251 to be described below. According to the drawing, the simulation device 50 includes a simulation chamber 51 which stores oil discharged from the first oil pressure port 24*a* of the master cylinder 20, a reaction piston 52 provided inside the simulation chamber 51, a pedal simulator including a reaction spring 53 which elastically supports the reaction piston 52, and a simulation valve 54 connected to a rear end of the simulation chamber 51. Here, the simulation chamber 51 is installed to have a displacement in a predetermined range determined by the oil which flows into the simulation chamber 51 due to the reaction piston 52 and the reaction spring 53.

The simulation valve 54 is formed to connect the rear end of the simulation chamber 51 and the reservoir 30. That is, an inlet of the simulation chamber 51 is connected to the master cylinder 20, the rear end of the simulation chamber 51 is connected to the simulation valve 54, and the simulation valve 54 is connected to the reservoir 30, and thus, the pedal simulator, i.e., the entire inside volume of the simulation chamber 51, is filled with oil.

The simulation valve 54 is formed with a solenoid valve in a normal closed type which is in a closed state at ordinary time, and when a driver steps on the brake pedal 10, the simulation valve 54 is open to transfer brake oil to the simulation chamber 51.

Further, a simulation check valve 55 is installed parallel to the simulation valve 54. The simulation check valve 55 allows oil to flow from the reservoir 30 into only the simulation chamber 51. That is, the reaction piston 52 of the pedal simulator compresses the reaction spring 53, and oil inside the simulation chamber 51 is transferred to the reservoir 30 through the simulation valve 54. Thus, since the simulation chamber 51 is filled with oil, when the simulation device 50 operates, friction of the reaction piston 52 is minimized, and thus the durability of the simulation device 50 is improved, and the structure thereof blocks ingress of a foreign material from the outside.

Furthermore, when the pedal effort of the brake pedal 10 is released, supplying oil to the simulation chamber 51 through the simulation check valve 55 ensures that the pressure of the pedal simulator is quickly returned.

The electronic brake system according to the embodiment of the present invention includes a mechanically operating hydraulic pressure supply unit 100 which receives an electrical signal from the pedal displacement sensor 11 for detecting a displacement of the brake pedal 10 when a driver steps on a brake, an oil pressure control unit 200 formed with first and second oil pressure circuits 201 and 202 each having two wheels which control the flow of the hydraulic pressure delivered to the wheel cylinder 40 provided on each wheel RR, RL, FR, and FL, a first cut valve 261 which is provided on the first backup path 251 for connecting the first oil pressure port 24*a* and the first oil pressure circuit 201 and controls a flow of the hydraulic pressure, a second cut valve 262 which is provided on a second backup path 252 for connecting the second oil pressure port 24*b* and the second oil pressure circuit 202 and controls a flow of the hydraulic pressure, and an electronic control unit (ECU) (not shown) which controls the hydraulic pressure supply unit 100 and valves 54, 221, 222, 223, 224, 241, 242, 261, and 262 based on the hydraulic pressure information and the pedal displacement information.

The hydraulic pressure supply unit 100 includes a pressure chamber 110 in which a predetermined space is provided to receive and store oil, a pressure piston 120 and an oil pressure spring 122 provided in the pressure chamber 110, a motor 140 which generates a rotary power in response to the electrical signal of the pedal displacement sensor 11, and a power converter 130 which converts a rotary movement of the motor 140 to a rectilinear movement to move the oil pressure piston 120 in a straight line. Here, the reservoir 30 and the pressure chamber 110 are connected by an oil path 103 to supply the oil to the pressure chamber 110. In addition, the signal detected by the pedal displacement sensor 11 is transmitted to the ECU, and the ECU controls the motor 140 and valves included in the electronic brake system according to the embodiment of the present invention which will be described below. Operations for controlling a plurality of valves due to a displacement of the brake pedal 10 will be described below.

As described above, the pressure chamber 110 is connected to the reservoir 30 by the oil path 103 and receives and stores the oil. As described above, the oil pressure piston 120 and the oil pressure spring 122 which elastically supports the oil pressure piston 120 are provided in the pressure chamber 110. Here, the hydraulic pressure generated by the pressure of the oil pressure piston 120 is transferred to the wheel cylinder 40 installed in each wheel RR, RL, FR, and FL through a main oil pressure path 210.

The oil pressure piston 120 which presses the pressure chamber 110 is connected to the power converter 130 which converts the rotary power of the motor 140 to a rectilinear movement in the pressure chamber 110 and moves slidably.

The power converter 130 is a device which converts rotatory power to rectilinear movement, and is formed with, for example, a ball screw nut assembly. For example, the power converter 130 may be formed with a screw integrally formed with a rotating shaft of the motor 140 (not shown), and a ball nut which is screw-coupled with the screw with restricted rotation and performs a rectilinear movement according to the rotation of the screw. That is, the screw serves as the rotating shaft of the motor 140 and serves to perform a rectilinear movement of the ball nut. Here, the oil pressure piston 120 is connected to the ball nut of the power converter 130 to press the pressure chamber 110 by the rectilinear movement of the ball nut, and the oil pressure spring 122 serves to return the oil pressure piston 120 to its original position when the ball nut is returned to its original position.

Meanwhile, although not shown, the power converter 130 may also be formed with a ball nut rotatable by receiving rotatory power from the rotating shaft of the motor 140 and a screw which is screw-coupled with the ball nut with restricted rotation and performs a rectilinear movement according to the rotation of the ball nut. Such ball screw nut assembly structure is a published well known technique for a device which converts a rotary movement to a rectilinear movement, and thus a detailed description thereof will be omitted. Further, other than the ball screw nut assembly, the power converter 130 according to the embodiment of the present invention should be understood to encompass any structure capable of converting a rotary movement to a rectilinear movement.

The motor 140 is an electrical motor which generates a rotatory power in response to a signal output from the ECU and generates the rotatory power in a normal or reverse direction depending on the ECU. Here, a precise control is possible due to a control of a rotation angle or speed of the motor 140. Such a motor 140 is a published well known technique, and thus a detailed description thereof will be omitted.

Additionally, a check valve 102 is installed on the oil path 103 to prevent a backflow of the pressure of the pressure chamber 110. The check valve 102 serves to prevent a backflow of the pressure of the pressure chamber 110 and also suctions and stores the oil in the pressure chamber 110 when the oil pressure piston 120 is reset.

When an electronic brake system including the above hydraulic pressure supply unit 100 is used, the electronic brake system may be formed to prevent cases where the pressure in the pressure chamber 110 does not return to the atmospheric pressure in the process of suctioning oil into the pressure chamber 110 while resetting the oil pressure piston 120. For example, a cut-off hole 111 is formed in the pressure chamber 110, and a connection path 101 which connects the cut-off hole 111 and the oil path 103 is formed between the pressure chamber 110 and the oil path 103. Here, the cut-off hole 111 is formed at a position corresponding to the initial position of the oil pressure piston 120. Thus, when the oil pressure piston 120 is reset, the oil pressure piston 120 is automatically connected to the reservoir 30 through the connection path 101, and thus the pressure of the pressure chamber 110 is returned to atmospheric pressure.

Meanwhile, a reference mark 'PS1' which is not described refers to a first pressure sensor which detects a hydraulic pressure of the pressure chamber 110.

The oil pressure control unit 200 is formed with the first oil pressure circuit 201 and the second oil pressure circuit 202 which receive a hydraulic pressure to each control two wheels. According to the drawing, the wheel controlled by the first oil pressure circuit 201 may be formed with a right front wheel FR and a left rear wheel RL, and the wheel controlled by the second oil pressure circuit 202 may be formed with a left front wheel FL and a right rear wheel RR. The wheel cylinder 40 is installed in each of the wheels FR, FL, RR, and RL and receives the hydraulic pressure to perform braking. That is, the oil pressure control unit 200 receives the hydraulic pressure from the hydraulic pressure supply unit 100 through the main oil pressure path 210 connected to the first and second oil pressure circuits 201 and 202, and each of the oil pressure circuit 201 and 202 includes a plurality of valves 221, 222, 223, 224, 241, and 242 to control a flow of the hydraulic pressure.

The first oil pressure circuit 201 includes first and second inlet valves 221 and 222 connected to the main oil pressure path 210 to control the hydraulic pressure transferred to the wheel cylinders 40 and a first balance valve 241 which connects or disconnects two wheel cylinders 40 respectively connected to the first inlet valve 221 and the second inlet valve 222. Specifically, the first inlet valve 221 is provided on the first oil pressure path 211 which connects the main oil pressure path 210 and the right front wheel FR, and the second inlet valve 222 is provided on the second oil pressure path 212 which connects the main oil pressure path 210 and the left rear wheel RL. The first balance valve 241 is provided on a path which connects the first oil pressure path 211 and the second oil pressure path 212 and serves to connect or disconnect the first and second oil pressure paths 211 and 212 according to an opening or closing operation thereof.

The second oil pressure circuit 201 includes third and fourth inlet valves 223 and 224 connected to the main oil pressure path 210 to control a hydraulic pressure transferred to the wheel cylinders 40 and a second balance valve 242 which connects or disconnects two wheel cylinders 40 respectively connected to the third inlet valve 223 and the fourth inlet valve 224. Specifically, the third inlet valve 223 is provided on the third oil pressure path 213 which connects the main oil pressure path 210 and the right rear wheel RR, and the fourth inlet valve 224 is provided on the fourth oil pressure path 214 which connects the main oil pressure path 210 and the left front wheel FL. The second balance valve 242 is provided on a path which connects the third oil pressure path 213 and the fourth oil pressure path 214 and serves to connect or disconnect the third and fourth oil pressure paths 213 and 214 according to an opening or closing operation thereof.

The opening and closing operations of the first to fourth inlet valves 221, 222, 223, and 224 are independently controlled by the ECU and are performed to transfer the hydraulic pressure generated from the hydraulic pressure supply unit 100 to wheel cylinders 40. That is, the first and second inlet valves 221 and 222 are formed to control the hydraulic pressure supplied to the first oil pressure circuit 201, and the third and fourth inlet valves 223 and 224 are formed to control the hydraulic pressure supplied to the second oil pressure circuit 202.

According to one embodiment of the present invention, the hydraulic pressure may be transferred to each wheel cylinder 40 of the wheels FR, FL, RR, and RL by opening any two inlet valves of the four inlet valves 221, 222, 223, and 224. For example, as shown in FIG. 2, the hydraulic pressure may be transferred to each wheel cylinder 40 of the wheel FR, FL, RR, and RL by opening the first inlet valve 221 of the first and second inlet valves 221 and 222 and opening the fourth inlet valve 224 of the third and fourth inlet valves 223 and 224. That is, the hydraulic pressure passing through the first and fourth inlet valves 221 and 224 is transferred to adjacent wheel cylinders 40 through the first and second balance valves 241 and 242. Here, although the hydraulic pressure is transferred to each wheel cylinder 40 by opening inlet valves 221 and 224 respectively in the first oil pressure circuit 201 and the second oil pressure circuit 202, the present invention is not limited thereto, and the hydraulic pressure may be transferred to each wheel cylinder 40 by opening two inlet valves 221 and 222 provided in the first oil pressure circuit 201 according to the structure of the connection paths. Meanwhile, when there is a need for an emergency braking, the hydraulic pressure may also be quickly transferred to each wheel cylinder 40 by opening all of the inlet valves 221, 222, 223, and 224.

The first to fourth inlet valves 221, 222, 223, and 224 are provided with solenoid valves in a normal closed type which operates a valve to be open when an open signal is received in a state in which the valve is closed at ordinary time. Further, the first and second balance valves 241 and 242 are provided with solenoid valves in a normal open type which operates a valve to be closed when a close signal is received from the ECU in a state in which the valve is open at ordinary time.

According to one aspect of the present invention, when the electronic brake system operates abnormally, the first and second backup paths 251 and 252 are provided to directly supply oil generated from the master cylinder 20 to each wheel cylinder 40. Specifically, the first cut valve 261 is provided on the first backup path 251 to control a flow of the oil, and the second cut valve 262 is provided on the second backup path 252 to control a flow of the oil. Further, the first backup path 251 connects the first oil pressure port 24a and the first oil pressure circuit 201, and the second backup path 252 connects the second oil pressure port 25b and the second oil pressure circuit 202. According to the drawing, the first backup path 251 is connected to the first balance valve 241 connected to the first oil pressure path 211 and the second oil pressure path 212, and the second backup path 252 is connected to the second balance valve 242 connected to the third oil pressure path 213 and the fourth oil pressure path 214. Operating configurations of the first and second cut valves 261 and 262 will be described below.

The first and second cut valves 261 and 262 are provided with solenoid valves in a normal open type which operates a valve to be closed when a close signal is received from the ECU in a state in which the valve is open at ordinary time.

Meanwhile, a reference mark 'PS2' which is not described refers to a second pressure sensor which measures a pressure of oil of the master cylinder 20.

Hereinafter, an operation of the electronic brake system according to one exemplary embodiment of the present invention will be described in detail.

FIG. 2 is an oil pressure circuit diagram when a brake of an electronic brake system operates normally.

Referring to FIG. 2, when a driver starts braking, an amount of braking required by the driver may be detected using pressure information and the like via the pedal displacement sensor 11 responding to the brake pedal 10 pressed by the driver. The ECU (not shown) drives the motor 140 by receiving an electrical signal output from the pedal displacement sensor 11. Further, the ECU may detect an amount of regenerative braking via a second pressure sensor PS2 provided at an outlet of the master cylinder 20 and a first pressure sensor PS1 provided at the main oil pressure path 210 and may calculate an amount of frictional brake according to a difference between the amount of braking required by the driver and the amount of regenerative braking, and thus the size of increase or reduction of the pressure of the wheels may be determined.

Specifically, when a driver steps on the brake pedal 10 in an initial stage of braking, the motor 140 is operated, the rotatory power of the motor 140 is converted to a rectilinear movement by the power converter 130 to move the oil pressure piston 120 forward, and a hydraulic pressure is generated by pressing the pressure chamber 110. Here, the first and second cut valves 261 and 262 installed on the first and second backup paths 251 and 252 respectively connected to the first and second oil pressure ports 24a and 24b of the master cylinder 20 are closed so that an oil pressure generated from the master cylinder 20 is not transferred to each wheel cylinder 40.

Further, the hydraulic pressure generated from the pressure chamber 110 is transferred to the wheel cylinders 40 of the right front wheel FR and the left front wheel FL by opening the first and fourth inlet valves 221 and 224 so as to generate a braking force. At this point, the hydraulic pressure which flows through the first and fourth inlet valves 221 and 224 is transferred to the wheel cylinders 40 of the left rear wheel RL and the right rear wheel RR through the first and second balance valves 241 and 242 which are open. That is, the hydraulic pressure is supplied to all of the wheel cylinders 40 by the opening operations of the two inlet valves 221 and 224 selected from four inlet valves 221, 222, 223, and 224.

Such an operation is an operation in a typical braking situation, and when there is a need for an emergency braking, the hydraulic pressure may also be quickly transferred to the wheel cylinders 40 by opening all of the inlet valves 221, 222, 223, and 224.

Meanwhile, the pressure generated by a pedal effort of the brake pedal 10 pressing the master cylinder 20 is transferred to the simulation device 50 connected to the master cylinder 20. Here, the simulation valve 54 in a normal closed type disposed at a rear end of the simulation chamber 51 is open, and the oil filled in the simulation chamber 51 is transferred to the reservoir 30 through the simulation valve 54. Further, the reaction piston 52 moves, and a pressure corresponding to the weight of the reaction spring 53 which supports the reaction piston 52 is formed in the simulation chamber 51, and thus a suitable pedal sensitivity is provided to a driver.

Next, the case of a brake release when the electronic brake system operates normally will be described with reference to FIG. 3. As shown in FIG. 3, when a pedal effort on the brake pedal 10 is released, rotatory power is generated in a direction opposite to a forward direction in which the motor 140 moves the oil pressure piston 120, and the oil pressure piston 120 is returned to an original position thereof. Here, the first to fourth inlet valves 221, 222, 223, and 224 and the first and second balance valves 241 and 242 are controlled by the same opening and closing operations during braking. That is, the second and third inlet valves 222 and 223 are provided in a closed state, and the first and fourth inlet valves 221 and 224 are open. Accordingly, the hydraulic pressure discharged from the wheel cylinders 40 of the first oil pressure circuit 201 is transferred to the pressure chamber 110 through the first balance valve 241 and the first inlet valve 221, and the hydraulic pressure discharged from the wheel cylinders 40 of the second oil pressure circuit 202 is transferred to the pressure chamber 110 through the second balance valve 242 and the fourth inlet valve 224.

In the simulation device 50, the oil inside the simulation chamber 51 is transferred to the master cylinder 20 due to the reaction piston 52 returning to the original position by the reaction spring 53, and oil is filled again in the simulation chamber 51 through the simulation valve 54 and the simulation check valve 55 connected to the reservoir 30, thereby ensuring that the pressure of the pedal simulator is quickly reset.

Meanwhile, when the oil pressure piston 120 moves due to the hydraulic pressure supply unit 100 of the above-described electronic brake system, a flow of the oil inside the pressure chamber 110 is controlled through the oil path 103 and the connection path 101 connected to the reservoir 30.

Meanwhile, the electronic brake system according to one embodiment of the present invention may specifically control a control range by controlling the valves 221, 222, 223, 224, 241, and 242 provided in the oil pressure control unit 200 according to the pressure required by the wheel cylinder 40 each provided on wheels RR, RL, FR, and FL of two oil pressure circuits 201 and 202. For example, FIG. 4 illustrates the case in which braking is performed on only the corresponding wheel cylinder while operating an anti-lock brake system (ABS) and illustrates braking only a front wheel.

Referring to FIG. 4, the motor 140 operates according to a pedal effort of the brake pedal 10, rotatory power of the motor 140 is converted to a rectilinear movement, and thus a hydraulic pressure is generated by moving the pressure piston 120 forward and pressing the pressure chamber 110. Here, the first and second cut valves 261 and 262 are closed and the pressure of the oil generated from the master cylinder 20 is not transferred to the wheel cylinder 40. Further, the second and third inlet valves 222 and 223 and the first and second balance valves 241 and 242 are closed. Thus, the hydraulic pressure generated from the pressure chamber 110 is transferred to the wheel cylinder 40 of the right wheel FR through the first inlet valve 221 and is transferred to the wheel cylinder 40 of the left front wheel FL through the fourth inlet valve 224. Accordingly, the hydraulic pressure is transferred to only the front wheels FL and FR among the wheels RL, RR, FL, and FR.

According to one aspect of the present invention, since the operations of the first to fourth inlet valves 221, 222, 223, and 224, and the first and second balance valves 241 and 242 are independently controlled as described above, the hydraulic pressure may be transferred to only the rear wheels RR and RL, or the hydraulic pressure may be transferred to the wheel cylinders 40 of the left front and the left rear wheels FL and RL, the right front and left rear wheels FR and RL, or whichever requires the oil pressure.

Further, in the electronic brake system according to the present invention, the brake pressure supplied to the wheel cylinder 40 may only be discharged by the corresponding wheel cylinder 40. For example, FIG. 5 illustrates a case in which the electronic brake system operates in a dump mode to only discharge the hydraulic pressure of the corresponding wheel cylinder 40, and illustrates dumping for only the rear wheels RR and RL.

Referring to FIG. 5, the motor 140 operates according to a pedal effort of the brake pedal 10, rotary power of the motor 140 is converted to a rectilinear movement, and thus a hydraulic pressure is suctioned into the pressure chamber 110 by moving the oil pressure piston 120 backward. Here, the first and fourth inlet valves 221 and 224, and the first and second balance valves 241 and 242 are closed. Thus, the hydraulic pressure transferred to the wheel cylinder 40 of the right rear wheel RR and the wheel cylinder 40 of the left rear wheel RL is suctioned into the pressure chamber 110 through the second and third oil pressure paths 212 and 213 and the main oil pressure path 210. Accordingly, the hydraulic pressure is dumped to only the rear wheels RR and RL among the wheels RL, RR, FL, and FR and is transferred to the pressure chamber 110.

According to one aspect of the present invention, since the operations of the first to fourth inlet valves 221, 222, 223, and 224 and the first and second balance valves 241 and 242 are independently controlled, the hydraulic pressure may be dumped to only the rear wheels RR and RL; or the pressure of the corresponding wheel cylinders 40 of the left front and left rear wheels FL and RL, the right front and left rear wheels FR and RL, or the like may be dumped by moving the oil pressure piston 120 backward. Here, the pressure of the corresponding wheel cylinders 40 may be dumped based on priorities if needed.

Finally, the case of abnormal operation of the electronic brake system will be described. Referring to FIG. 6, when the electronic brake system operates abnormally, each of the valves 54, 221, 222, 223, 224, 241, 242, 261, and 262 is provided in an initial non-operational braking state. Thus, when a driver presses the brake pedal 10, the input rod 12 connected to the brake pedal 10 moves leftward, and the first piston 21a in contact with the input rod 12 is simultaneously moved leftward. Further, the second piston 22a is also moved leftward by the first piston 21a. Here, since there is no gap between the input rod 12 and the first piston 21a, braking may be quickly performed. That is, the hydraulic pressure generated by pressing the master cylinder 20 is transferred to the wheel cylinders 40 through the first and second backup paths 251 and 252 connected for braking in a backup mode so as to generate a braking force. Here, the first and second cut valves 261 and 262 installed on the first and second backup paths 251 and 252, and the first and second balance valves 241 and 242 connected to the first and second backup paths 251 and 252 are formed with solenoid valves in a normal open type, and the simulation valve 54 and the first to fourth inlet valves 221, 222, 223, and 224 are formed with solenoid valves in a normal closed type, and thus the hydraulic pressure is immediately transferred to the wheel cylinders 40. Therefore, stable braking can be achieved, and the braking stability can be improved.

As is apparent from the above description, the electronic brake system according to embodiments of the present invention may have the following effects.

First, the electronic brake system has an advantage of structural simplification from the conventional structures by minimizing the number of valves for controlling a flow of oil pressure. Therefore, the size of the brake system, i.e., the size of a modulator block in which the valves are installed, can be reduced allowing the electronic brake system to be implemented as a low cost product.

Second, since pressure is applied to all of the wheel cylinders using only two inlet valves among the four inlet valves for controlling a flow of a hydraulic pressure transferred to each wheel cylinder, operating noise and vibration of the valves can be minimized.

Third, since interlinked a motor and valves are controlled, the electronic brake system can precisely control the pressure. In addition, the electronic brake system is formed with two oil pressure circuits each connected to each of two wheels controlled independently and are linked with and control a hydraulic pressure supply unit according to the pressure required by each wheel and a determination by a priority determining logic, thereby the control capability can be enhanced.

Fourth, when the brake system fails, a pedal effort of a driver is directly transferred to the master cylinder, so that braking the vehicle is still possible, and thus a stable braking force can be provided.

Although a few embodiments of the present invention have been shown and described, it would be appreciated by those skilled in the art that changes may be made in these embodiments without departing from the principles and spirit of the invention, the scope of which is defined in the claims and their equivalents.

| Descriptions of reference numbers |
|---|
| 10: brake pedal |
| 11: pedal displacement sensor |
| 20: master cylinder |
| 30: reservoir |
| 40: wheel cylinder |
| 50: simulation device |
| 54: simulation valve |
| 100: hydraulic pressure supply unit |
| 110: pressure chamber |
| 120: oil pressure piston |
| 130: power converter |
| 140: motor |
| 200: oil pressure control unit |
| 201: first oil pressure circuit |
| 202: second oil pressure circuit |
| 210: main oil pressure path |
| 221: first inlet valve |
| 222: second inlet valve |
| 223: third inlet valve |
| 224: fourth inlet valve |
| 241: first balance valve |
| 242: second balance valve |
| 251: first backup path |
| 252: second backup path |
| 261: first cut valve |
| 262: second cut valve |

What is claimed is:

1. An electronic brake system including a reservoir in which oil is stored, a master cylinder having a first oil pressure port and a second oil pressure port and coupled with the reservoir to receive the oil, a pedal displacement sensor configured to detect a displacement of a brake pedal, and a simulation device connected to the master cylinder and provided so that reaction is provided according to a pedal effort of the brake pedal, the electronic brake system comprising:
 a hydraulic pressure supply unit configured to output an electrical signal through the pedal displacement sensor to operate a motor when the brake pedal operates, and configured to convert rotatory power of the motor to rectilinear movement;
 an oil pressure control unit having a first oil pressure circuit and a second oil pressure circuit connected to the hydraulic pressure supply unit through a main oil pressure path, and each configured to control two wheels so that a hydraulic pressure is received using a force generated by the hydraulic pressure supply unit to perform braking; and
 an electronic control unit configured to control the motor and valves based on hydraulic pressure information and pedal displacement information,
 wherein the oil pressure control unit includes:
 a first inlet valve and a second inlet valve respectively disposed at upper streams of two wheel cylinders to control the hydraulic pressure flowing into the two wheel cylinders respectively installed on the two wheels provided in the first oil pressure circuit;
 a third inlet valve and a fourth inlet valve respectively disposed at upper streams of two wheel cylinders to control the hydraulic pressure flowing into the two wheel cylinders respectively installed on the two wheels provided in the second oil pressure circuit;
 a first balance valve configured to connect or disconnect the two wheel cylinders to which the first inlet valve and the second inlet valve are connected; and
 a second balance valve configured to connect or disconnect the two wheel cylinders to which the third inlet valve and the fourth inlet valve are connected,
 wherein the hydraulic pressure discharged from the four wheel cylinders is controlled by a rotation in a direction opposite to a rotation direction of the motor of the hydraulic pressure supply unit while braking, and
 wherein when the hydraulic pressure is discharged from the wheel cylinders by rotating the motor of the hydraulic pressure supply unit in a reverse direction, only one of the first inlet valve and the second inlet valve is open and only one of the third inlet valve and the fourth inlet valve is open.

2. The electronic brake system of claim 1, wherein the inlet valves are provided with solenoid valves in a normal closed type which operates a valve to be open when an open signal is received in a state in which the valve is closed at ordinary time.

3. The electronic brake system of claim 1, wherein when the hydraulic pressure is discharged from the wheel cylinders by rotating the motor of the hydraulic pressure supply unit in a reverse direction, the first balance valve and the second balance valve are open.

4. The electronic brake system of claim 3, wherein the first and second balance valves are provided with solenoid valves in a normal open type which operates a valve to be closed when a close signal is received from the electronic control unit in a state in which the valve is open at ordinary time.

5. The electronic brake system of claim 1, further comprising:
 a first backup path configured to connect the first oil pressure port and the first balance valve so that oil is directly supplied to the wheel cylinders when the electronic brake system operates abnormally;
 a second backup path configured to connect the second oil pressure port and the second balance valve;
 a first cut valve provided on the first backup path and configured to control a flow of the oil; and
 a second cut valve provided on the second backup path and configured to control a flow of the oil.

6. The electronic brake system of claim 5, wherein the first and second cut valves are provided with solenoid valves in a normal open type which operates a valve to be closed when a close signal is received from the electronic control unit in a state in which the valve is open at ordinary time.

7. The electronic brake system of claim 1, wherein the hydraulic pressure supply unit includes:
 a motor configured to generate a rotatory power by the electrical signal of the pedal displacement sensor;
 a power converter configured to convert a rotary movement of the motor to a rectilinear movement;
 an oil pressure piston connected to the power converter and configured to perform a rectilinear movement;
 a pressure chamber slidably provided with the oil pressure piston and connected to the first and second oil pressure circuits through the main oil pressure path; and
 an oil pressure spring provided in the pressure chamber and configured to elastically support the oil pressure piston,
 wherein the pressure chamber is connected to the reservoir through an oil path to receive the oil.

8. The electronic brake system of claim 7, wherein a check valve is installed on the oil path to prevent a flow of a pressure of the pressure chamber backward, and to suction and store the oil in the pressure chamber when the oil pressure piston is returned.

9. An electronic brake system including a reservoir in which oil is stored, a master cylinder having a first oil pressure port and a second oil pressure port and coupled with the reservoir to receive the oil, a pedal displacement sensor configured to detect a displacement of a brake pedal, and a simulation device connected to the master cylinder and provided so that reaction is provided according to a pedal effort of the brake pedal, the electronic brake system comprising:
 a hydraulic pressure supply unit configured to output an electrical signal through the pedal displacement sensor to operate a motor when the brake pedal operates, and configured to convert rotatory power of the motor to rectilinear movement;
 an oil pressure control unit having a first oil pressure circuit and a second oil pressure circuit connected to the hydraulic pressure supply unit through a main oil pressure path, and each configured to control two wheels so that a hydraulic pressure is received using a force generated by the hydraulic pressure supply unit to perform braking;
 an electronic control unit configured to control the motor and valves based on hydraulic pressure information and pedal displacement information;
 a first backup path configured to connect the first oil pressure port and a first balance valve so that oil is directly supplied to the wheel cylinders when the electronic brake system operates abnormally;
a second backup path configured to connect the second oil pressure port and a second balance valve;
a first cut valve provided on the first backup path and configured to control a flow of the oil; and
a second cut valve provided on the second backup path and configured to control a flow of the oil,
wherein the oil pressure control unit includes:
a first inlet valve and a second inlet valve respectively disposed at upper streams of two wheel cylinders to control the hydraulic pressure flowing into the two wheel cylinders respectively installed on the two wheels provided in the first oil pressure circuit;
a third inlet valve and a fourth inlet valve respectively disposed at upper streams of two wheel cylinders to control the hydraulic pressure flowing into the two wheel cylinders respectively installed on the two wheels provided in the second oil pressure circuit;
the first balance valve configured to connect or disconnect the two wheel cylinders to which the first inlet valve and the second inlet valve are connected; and
the second balance valve configured to connect or disconnect the two wheel cylinders to which the third inlet valve and the fourth inlet valve are connected,
wherein the hydraulic pressure discharged from the four wheel cylinders is controlled by a rotation in a direction opposite to a rotation direction of the motor of the hydraulic pressure supply unit while braking.

10. The electronic brake system of claim 9, wherein the inlet valves are provided with solenoid valves in a normal closed type which operates a valve to be open when an open signal is received in a state in which the valve is closed at ordinary time.

11. The electronic brake system of claim 9, wherein when the hydraulic pressure is discharged from the wheel cylinders by rotating the motor of the hydraulic pressure supply unit in a reverse direction, the first balance valve and the second balance valve are open.

12. The electronic brake system of claim 9, wherein when the hydraulic pressure is discharged from the wheel cylinders by rotating the motor of the hydraulic pressure supply unit in a reverse direction, only one of the first inlet valve and the second inlet valve is open and only one of the third inlet valve and the fourth inlet valve is open.

13. The electronic brake system of claim 11, wherein the first and second balance valves are provided with solenoid valves in a normal open type which operates a valve to be closed when a close signal is received from the electronic control unit in a state in which the valve is open at ordinary time.

14. The electronic brake system of claim 9, wherein the first and second cut valves are provided with solenoid valves in a normal open type which operates a valve to be closed when a close signal is received from the electronic control unit in a state in which the valve is open at ordinary time.

15. The electronic brake system of claim 9, wherein the hydraulic pressure supply unit includes:
a motor configured to generate a rotatory power by the electrical signal of the pedal displacement sensor;
a power converter configured to convert a rotary movement of the motor to a rectilinear movement;
an oil pressure piston connected to the power converter and configured to perform a rectilinear movement;
a pressure chamber slidably provided with the oil pressure piston and connected to the first and second oil pressure circuits through the main oil pressure path; and
an oil pressure spring provided in the pressure chamber and configured to elastically support the oil pressure piston,
wherein the pressure chamber is connected to the reservoir through an oil path to receive the oil.

16. The electronic brake system of claim 15, wherein a check valve is installed on the oil path to prevent a flow of a pressure of the pressure chamber backward, and to suction and store the oil in the pressure chamber when the oil pressure piston is returned.

17. An electronic brake system including a reservoir in which oil is stored, a master cylinder having a first oil pressure port and a second oil pressure port and coupled with the reservoir to receive the oil, a pedal displacement sensor configured to detect a displacement of a brake pedal, and a simulation device connected to the master cylinder and provided so that reaction is provided according to a pedal effort of the brake pedal, the electronic brake system comprising:
a hydraulic pressure supply unit configured to output an electrical signal through the pedal displacement sensor to operate a motor when the brake pedal operates, and configured to convert rotatory power of the motor to rectilinear movement;
an oil pressure control unit having a first oil pressure circuit and a second oil pressure circuit connected to the hydraulic pressure supply unit through a main oil pressure path, and each configured to control two wheels so that a hydraulic pressure is received using a force generated by the hydraulic pressure supply unit to perform braking; and
an electronic control unit configured to control the motor and valves based on hydraulic pressure information and pedal displacement information,
wherein the oil pressure control unit includes:
a first inlet valve and a second inlet valve respectively disposed at upper streams of two wheel cylinders to control the hydraulic pressure flowing into the two wheel cylinders respectively installed on the two wheels provided in the first oil pressure circuit;
a third inlet valve and a fourth inlet valve respectively disposed at upper streams of two wheel cylinders to control the hydraulic pressure flowing into the two wheel cylinders respectively installed on the two wheels provided in the second oil pressure circuit; and
a plurality of oil pressure paths respectively connected between the two wheel cylinders which are connected to the first and second inlet valves and between the two wheel cylinders which are connected to the third and fourth inlet valves are connected;
wherein the hydraulic pressure discharged from the four wheel cylinders is controlled by a rotation in a direction opposite to a rotation direction of the motor of the hydraulic pressure supply unit while braking, and
wherein when the hydraulic pressure is transferred to or discharged from the two wheel cylinders respectively provided in the first and second oil pressure circuit, only one of the first inlet valve and the second inlet valve is open and only one of the third inlet valve and the fourth inlet valve is open.

18. The electronic brake system of claim 17, wherein the hydraulic pressure supply unit includes:
a first balance valve provided on the oil pressure path connected between the two wheel cylinders which are connected to the first and second inlet valves are connected and configured to connect or disconnect hydraulic pressure;

a second balance valve provided on the oil pressure path which connected between the two wheel cylinders which are connected to the third and fourth inlet valves are connected and configured to connect or disconnect hydraulic pressure.

19. The electronic brake system of claim 18, wherein when the emergency braking is needed, all of the inlet valve are opened to quickly transfer the hydraulic pressure to the wheel cylinders.

\* \* \* \* \*